(12) United States Patent
Schramm et al.

(10) Patent No.: US 8,205,631 B2
(45) Date of Patent: Jun. 26, 2012

(54) ACTIVE MATERIAL ACTUATED VENT VALVE

(75) Inventors: Michael R. Schramm, Perry, UT (US); David J. Green, Brigham City, UT (US)

(73) Assignee: Autoliv ASP, Inc., Ogden, UT (US)

( * ) Notice: Subject to any disclaimer, the term of this patent is extended or adjusted under 35 U.S.C. 154(b) by 723 days.

(21) Appl. No.: 12/274,164

(22) Filed: Nov. 19, 2008

(65) Prior Publication Data
US 2010/0122735 A1 May 20, 2010

(51) Int. Cl.
*F16K 17/40* (2006.01)

(52) U.S. Cl. .................. 137/68.3; 251/129.06; 220/89.3

(58) Field of Classification Search ............... 137/68.3; 251/129.06; 220/89.3
See application file for complete search history.

(56) References Cited

U.S. PATENT DOCUMENTS

| | | | |
|---|---|---|---|
| 2,417,374 A | 3/1947 | Morton | |
| 3,712,319 A | 1/1973 | Rhodes et al. | |
| 4,245,660 A | 1/1981 | Rozniecki | |
| 4,267,702 A | 5/1981 | Houk | |
| 4,430,392 A * | 2/1984 | Kelley et al. ........... | 429/53 |
| 4,493,664 A * | 1/1985 | Dale ....................... | 441/7 |
| 5,226,561 A | 7/1993 | Hamilton et al. | |
| 5,263,740 A | 11/1993 | Frey et al. | |
| 5,515,691 A | 5/1996 | Wertenbach et al. | |
| 5,577,389 A | 11/1996 | Albertson et al. | |
| 5,668,345 A | 9/1997 | Schroeder et al. | |
| 5,673,563 A | 10/1997 | Alberrtson et al. | |
| 5,782,486 A | 7/1998 | Barnes et al. | |
| 6,010,153 A | 1/2000 | Halas et al. | |
| 6,240,738 B1 | 6/2001 | Kato et al. | |
| 6,244,622 B1 | 6/2001 | Al-Amin et al. | |
| 6,260,571 B1 * | 7/2001 | Lind et al. .............. | 137/68.3 |
| 6,295,935 B1 | 10/2001 | Swann et al. | |
| 6,338,500 B1 | 1/2002 | Perotto | |
| 7,044,501 B2 | 5/2006 | Yamazaki | |
| 7,063,377 B2 | 6/2006 | Brei et al. | |
| 7,226,078 B2 | 6/2007 | Green et al. | |
| 7,373,944 B2 | 5/2008 | Smith et al. | |

(Continued)

FOREIGN PATENT DOCUMENTS
DE 4207859 9/1993
(Continued)

OTHER PUBLICATIONS
Office Action issued Mar. 12, 2007 in U.S. Appl. No. 11/023,155, now U.S. Patent No. 7,373,944.
(Continued)

*Primary Examiner* — John Rivell
*Assistant Examiner* — R. K. Arundale
(74) *Attorney, Agent, or Firm* — Sally J. Brown; Stoel Rives LLP.

(57) ABSTRACT

A relief valve and related systems and methods have particular use in fluid distribution lines. The relief valve comprises a body defining a cavity and comprising at least first and second openings in fluid communication with the cavity. A connector piece is connected to the body at the first opening to connect the valve to a fluid distribution line. A rupture disc is disposed within and obstructs the first opening. When it is desired that fluid from the fluid distribution line be vented from the system, the rupture disc is punctured via activation of an active material initiator and thereby allows for fluid communication through the first opening of the valve.

44 Claims, 10 Drawing Sheets

U.S. PATENT DOCUMENTS

| | | | |
|---|---|---|---|
| 7,740,081 B2 * | 6/2010 | Edwards et al. | 169/60 |
| 2003/0155755 A1 | 8/2003 | Iwai et al. | |
| 2004/0195815 A1 | 10/2004 | Browne et al. | |
| 2005/0061010 A1 | 3/2005 | Mu et al. | |
| 2005/0103379 A1 * | 5/2005 | Sundholm | 137/68.3 |
| 2005/0104391 A1 | 5/2005 | Browne et al. | |
| 2005/0146121 A1 | 7/2005 | Campbell et al. | |
| 2005/0199845 A1 | 9/2005 | Jones et al. | |
| 2005/0275243 A1 | 12/2005 | Browne et al. | |
| 2005/0275246 A1 | 12/2005 | Browne et al. | |
| 2006/0012191 A1 | 1/2006 | Brei et al. | |
| 2006/0033312 A1 | 2/2006 | Barvosa-Carter et al. | |
| 2006/0043715 A1 | 3/2006 | Green et al. | |
| 2006/0125291 A1 | 6/2006 | Buravalla et al. | |
| 2006/0137742 A1 | 6/2006 | Smith et al. | |
| 2006/0170243 A1 | 8/2006 | Browne et al. | |
| 2006/0202492 A1 | 9/2006 | Barvosa-Carter et al. | |
| 2006/0202512 A1 | 9/2006 | Brei et al. | |
| 2007/0169827 A1 | 7/2007 | Reck | |

FOREIGN PATENT DOCUMENTS

| | | | |
|---|---|---|---|
| EP | 1 580 051 A2 | | 9/2005 |
| JP | 60073200 A | * | 4/1985 |
| WO | WO 2006/025960 | | 3/2006 |

OTHER PUBLICATIONS

Interview Summary issued May 8, 2007 in U.S. Appl. No. 11/023,155, now U.S. Patent No. 7,373,944.

Amendment and Response to Office Action filed Jun. 6, 2007 in U.S. Appl. No. 11/023,155, now U.S. Patent No. 7,373,944.

Office Action issued Aug. 16, 2007 in U.S. Appl. No. 11/023,155, now U.S. Patent No. 7,373,944.

Amendment and Response to Office Action filed Oct. 16, 2007 in U.S. Appl. No. 11/023,155, now U.S. Patent No. 7,373,944.

Advisory Action issued Oct. 31, 2007 in U.S. Appl. No. 11/023,155, now U.S. Patent No. 7,373,944.

Supplemental Amendment and Response to Office Action filed Nov. 15, 2007 in U.S. Appl. No. 11/023,155, now U.S. Patent No. 7,373,944.

Notice of Allowance and Fee(s) Due issued Jan. 31, 2008 in U.S. Appl. No. 11/023,155, now U.S. Patent No. 7,373,944.

Office Action issued Oct. 29, 2006 in U.S. Appl. No. 10/927,698, now U.S. Patent No. 7,226,078.

Interview Summary issued Nov. 8, 2006 in U.S. Appl. No. 10/927,698, now U.S. Patent No. 7,226,078.

Amendment and Response filed Jan. 12, 2007 in U.S. Appl. No. 10/927,698, now U.S. Patent No. 7,226,078.

Notice of Allowance and Fee(s) Due issued Feb. 8, 2007 in U.S. Appl. No. 10/927,698, now U.S. Patent No. 7,226,078.

Notification of Transmittal of the International Search Report and the Written Opinion of the International Searching Authority issued Nov. 22, 2006 in International Application No. PCT/US2005/025391.

* cited by examiner

ACTIVE MATERIAL ACTUATED VENT VALVE

TECHNICAL FIELD

The present invention relates generally to the field of relief valves. More specifically, the present invention relates to active material relief valves for use in fluid systems such as vehicle refrigerant systems.

BRIEF DESCRIPTION OF THE DRAWINGS

The present embodiments will become more fully apparent from the following description and appended claims, taken in conjunction with the accompanying drawings. Understanding that the accompanying drawings depict only typical embodiments, and are, therefore, not to be considered to be limiting of the disclosure's scope, the embodiments will be described and explained with specificity and detail in reference to the accompanying drawings.

DETAILED DESCRIPTION OF PREFERRED EMBODIMENTS

It will be readily understood that the components of the embodiments as generally described and illustrated in the figures herein could be arranged and designed in a wide variety of different configurations. Thus, the following more detailed description of various embodiments, as represented in the figures, is not intended to limit the scope of the disclosure, as claimed, but is merely representative of various embodiments. While the various aspects of the embodiments are presented in drawings, the drawings are not necessarily drawn to scale unless specifically indicated.

The phrases "connected to," "coupled to" and "in communication with" refer to any form of interaction between two or more entities, including mechanical, electrical, magnetic, electromagnetic, fluid, and thermal interaction. Two components may be coupled to each other even though they are not in direct contact with each other. The term "abutting" refers to items that are in direct physical contact with each other, although the items may not necessarily be attached together.

The present disclosure describes relief valves, also called vent valves, that are actuated by an active material initiator. The term "active material" as used herein generally refers to a material that exhibits a change in a property such as dimension, shape, shear force, or flexural modulus upon application of an activation signal. Suitable active materials include, without limitation, shape memory alloys (SMA), ferromagnetic SMAs, shape memory polymers (SMP), piezoelectric materials, electroactive polymers (EAP), magnetorheological fluids and elastomers (MR), and electrorheological fluids (ER). Depending on the particular active material, the activation signal can take the form of, without limitation, an electric current, a temperature change, a magnetic field, a mechanical loading or stressing, or the like.

Figure 1A:
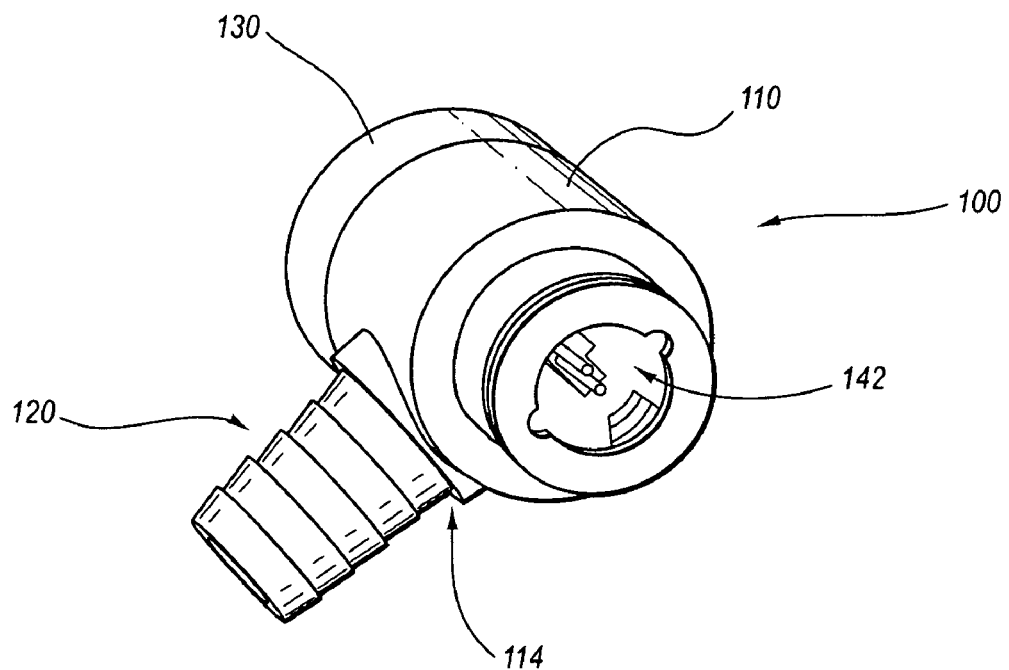
FIG. 1A is a perspective view of one embodiment of a relief valve.
Figure 1B:
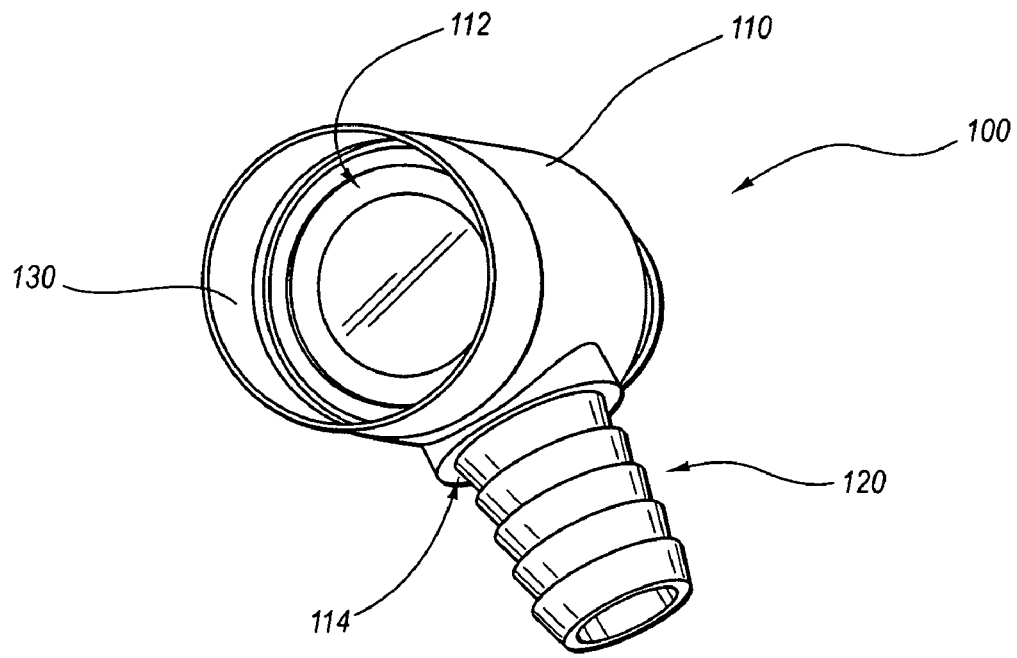
FIG. 1B is a perspective view of the embodiment of FIG. 1A at a different angle.

With reference to FIGS. 1A-1B, a relief valve 100 is shown including a body 110 having a first opening 112 and a second opening 114 in fluid communication with a cavity (not shown in FIGS. 1A-1B) defined by the body 110. Relief valve 100 also includes an electrical activator port 142 adapted to receive an electric connector (not shown). In some embodiments, body 110 is formed from a plastic material. In other embodiments, body 110 may be formed from a metal or any other suitable material.

In FIGS. 1A-1B, a hose nipple 120 is shown connected to body 110 at the second opening 114. As will be understood by those having skill in the art, a vent tube may be attached to the hose nipple 120 in order to direct vented fluid such as refrigerant from an automotive refrigeration line-from the relief valve to a desired location for storing and/or releasing the fluid. Hose nipple 120 may optionally be integrally formed with body 110.

Figure 2A:
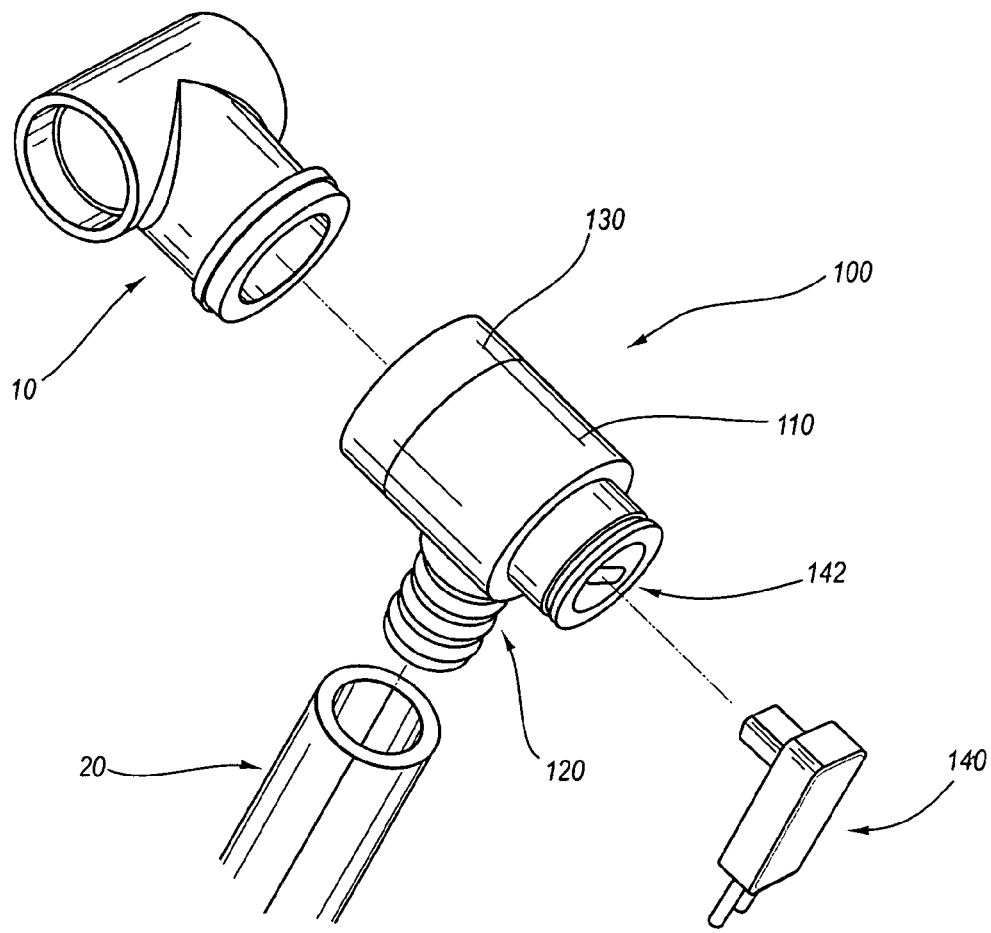
FIG. 2A is an exploded view depicting the relief valve embodiment of FIGS. 1A-1B.
Figure 2B:
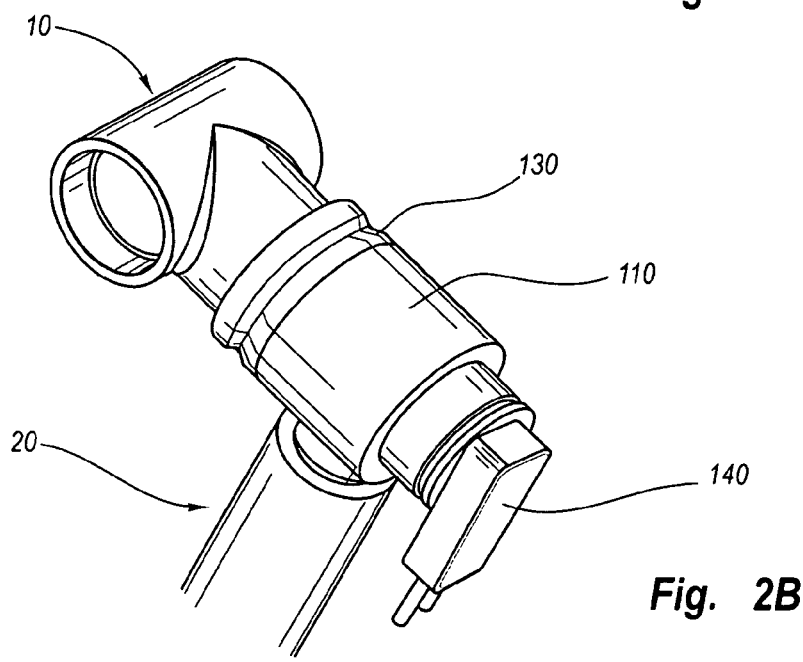
FIG. 2B is a perspective view of the relief valve embodiment of FIG. 2A.
Figure 3:
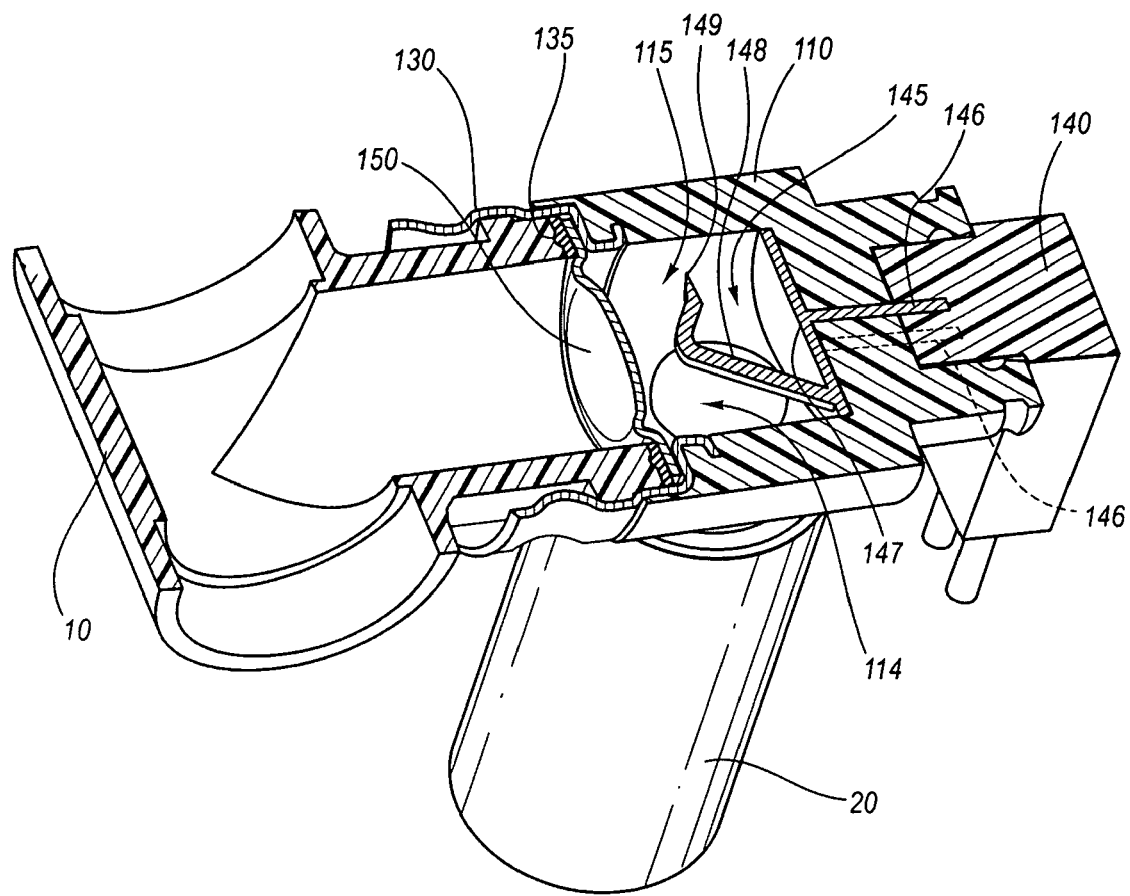
FIG. 3 is a cross-sectional view of a relief valve embodiment connected with a tee fitting.

A connector piece 130 is connected to body 110 at the first opening 112. Connector piece 130 may be integrally molded, threadably attached, or otherwise connected with the body 110. In FIGS. 1A-4B and FIGS. 7-8, the depicted embodiment of connector piece 130 comprises a crimp sleeve. A crimp sleeve typically comprises a permanently deformable material capable of providing a sealing engagement with a tee fitting or other suitable connector to connect the relief valve to a fluid distribution line. It should be understood that the term "tee fitting" does not imply that the fitting must be shaped like the letter "T". Any connector used to divert fluid at an angle from a fluid distribution line should be considered within the scope of this term. As shown in FIGS. 2A-2B and FIG. 3, the depicted crimp sleeve 130 can be positioned over the base of a refrigerant line tee fitting 10 and radially crimped or deformed, as shown in FIG. 2B, to provide a gripping force on tee fitting 10 and provide a seal to prevent whatever fluid is in the distribution line from leaking out. These figures also depict hose nipple 120 fit or being fit with a vent hose 20. Vent hose 20 may extend to any location at which it is desirable to dump or vent the gas released from the relief valve 100.

The embodiments depicted in the accompanying drawings also include an electrical activator 140. As will be described in greater detail below, electrical activator 140 is typically positioned opposite from first opening 112 and is typically connected to an active material initiator. Electrical activator 140 is received in port 142.

In the cross-sectional view of FIG. 3, it can be seen that the body 110 of relief valve 100 defines a cavity 115. Extending into cavity 115, and integrally molded with body 110, is an active material initiator 145. A rupture disc 150 is located on the opposite side of cavity 115 from active material initiator 145. Rupture disc 150 is disposed within and is designed to obstruct the first opening 112 in body 110. A sealing washer, such as sealing washer 135 shown in FIG. 3, may be used to facilitate positioning and sealing the rupture disc 150 into the first opening 112. Sealing washer 135 is positioned between tee fitting 10 and rupture disc 150. Rupture disc 150 is an example of valve means for selectively controlling fluid communication through the first opening.

Active material initiator 145 may comprise one or more electrical connectors 146, a base portion 147, a body portion 148, and an end portion 149. All or a portion of active material initiator 145 may comprise an active material, such as a shape memory alloy (SMA). Electrical connector 146 is configured to receive and be in electric communication with electrical activator 140. Base portion 147 may be configured to comprise a liquid-tight seal with valve body 110 as well as allow electric communication from electrical connector 146 to body portion 148. Body portion 148 may be coupled to base portion 147 at one end and have an end portion 149 at another end. Body portion 148 may comprise an active material, such as an SMA, and in the depicted embodiment comprises a bent portion. End portion 149 may comprise a contiguous extension of body portion 148, or may comprise a separate plastic or metal piece that is coupled to the body portion. End portion 149 may comprise a point or spike and is configured to rupture burst disc 150 upon actuation of relief valve 100.

As will be appreciated by one skilled in the art, a variety of types and configurations of active material initiators may be utilized in conjunction with a relief valve burst disc to activate the relief valve without departing from the scope and spirit of the present disclosure. For example, in one embodiment, the active material initiator comprises a single material, such as an SMA. In other embodiments, the active material initiator comprises SMA body and end portions, a plastic or non-SMA metal base portion, and a non-SMA electrical connector, such as one or more copper wires, wherein the electrical connector is electrically coupled to the SMA. In another embodiment, only the bent potion of the body portion comprises an SMA.

When conditions in the fluid distribution line are such that it is desirable to vent off some of the fluid in the line, a signal is sent to the electrical activator 140. The electrical activator 140 then actuates or deploys the active material initiator 145, thereby causing the active material initiator 145 to rupture the rupture disc 150. This is accomplished by electrical connector 146 receiving and transmitting the electrical signal to body portion 148 of active material initiator 145. The electrical signal causes the bent portion of body portion 148 to adopt a less bent configuration such that end portion 149 is placed in contact with burst disc 150, thereby rupturing the burst disc.

The methodology and structure by which the electrical activator deploys the initiator are well-known in the automotive protective systems industry. Examples of suitable technology for electrically deploying an initiator can be found in U.S. Pat. No. 5,263,740 issued to Frey et al., which is hereby incorporated by reference in its entirety. Once rupture disc 150 has been ruptured, fluid from the refrigerant or other fluid distribution line is able to pass through the first opening 112 and vent out the second opening 114 via the cavity 115. It should be understood that in some embodiments, an electrical activator may not be necessary and may instead be replaced with an activator that heats or cools the active material thereby causing it to change configurations and actuate the relief vent valve.

Figure 4A:
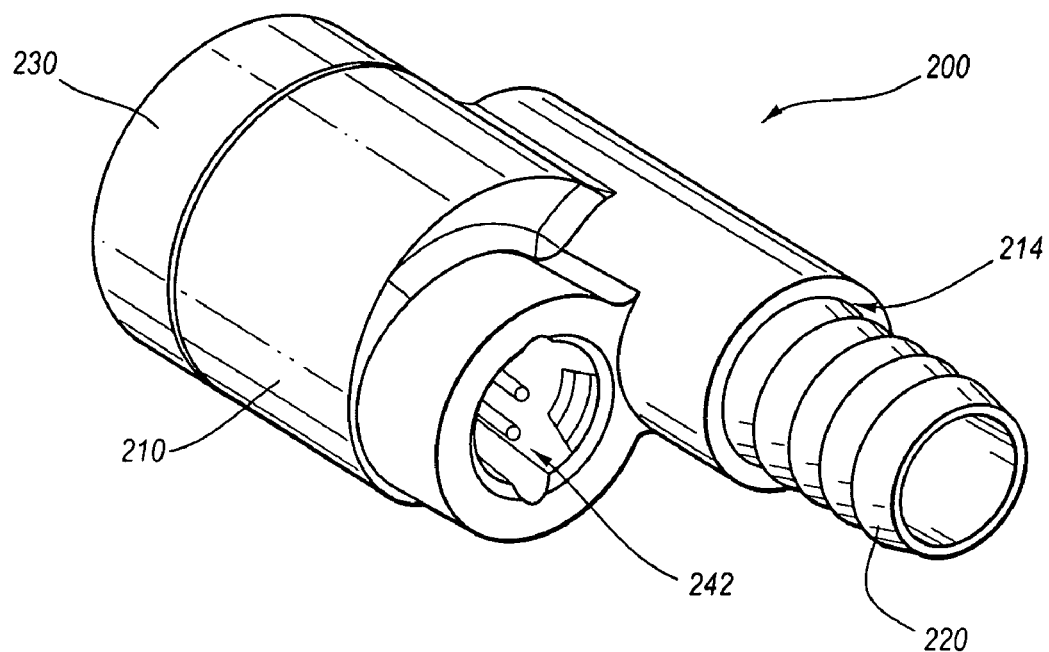
FIG. 4A is a perspective view of another embodiment of a relief valve.
Figure 4B:
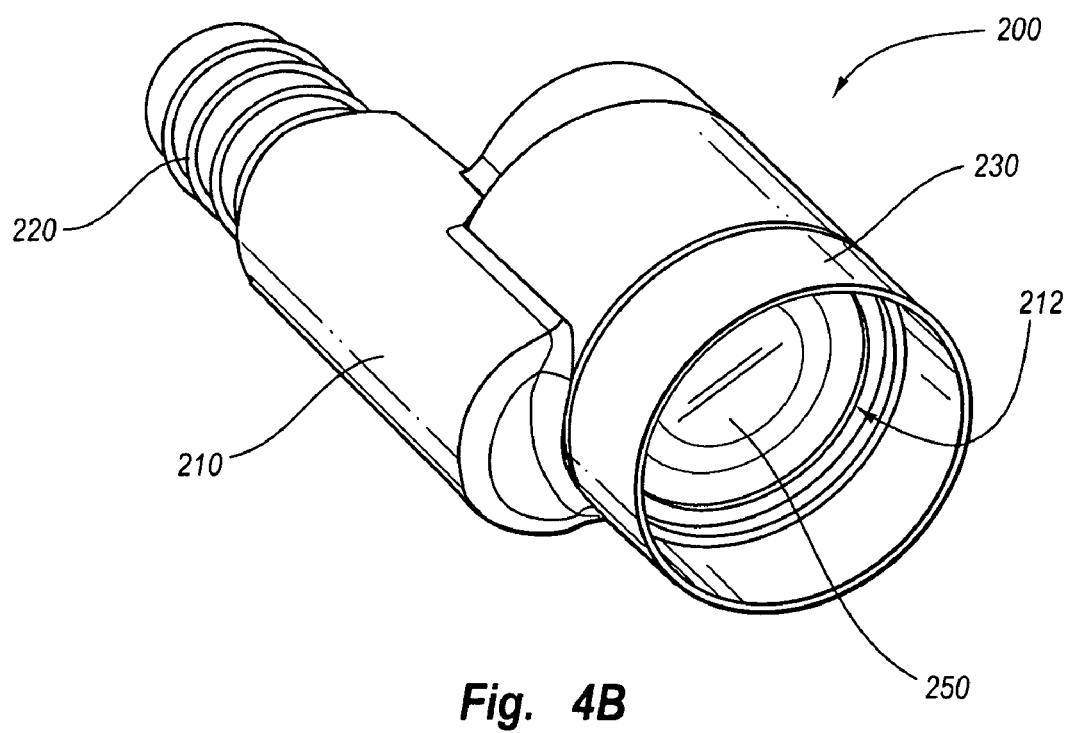
FIG. 4B is a different perspective view of the relief valve embodiment of FIG. 4A.

FIGS. 4A and 4B depict another embodiment of the invention. In relief valve 200 in these figures, the first opening 212 in the body 210 is axially parallel with the second opening 214 instead of being approximately perpendicular thereto as in the embodiment of FIGS. 1-3. Again, this embodiment has a connector piece (crimp sleeve 230), a hose nipple 220, an electrical activator port 242, and a rupture disc 250. The active material initiator, although not shown in the figures, is connected with activator 240 (not shown) and positioned opposite from the rupture disc 250.

In this embodiment, upon deployment of the active material initiator, the fluid in the line to which the crimp sleeve 230 is connected can be directed in generally one direction through the relief valve 200 without having to be re-directed and exit through the device at an angle with respect to its entry direction into the device. Of course, the relief valve may instead be manufactured such that the two openings are axially aligned with respect to one another instead of parallel to one another, if desired.

Figure 5:
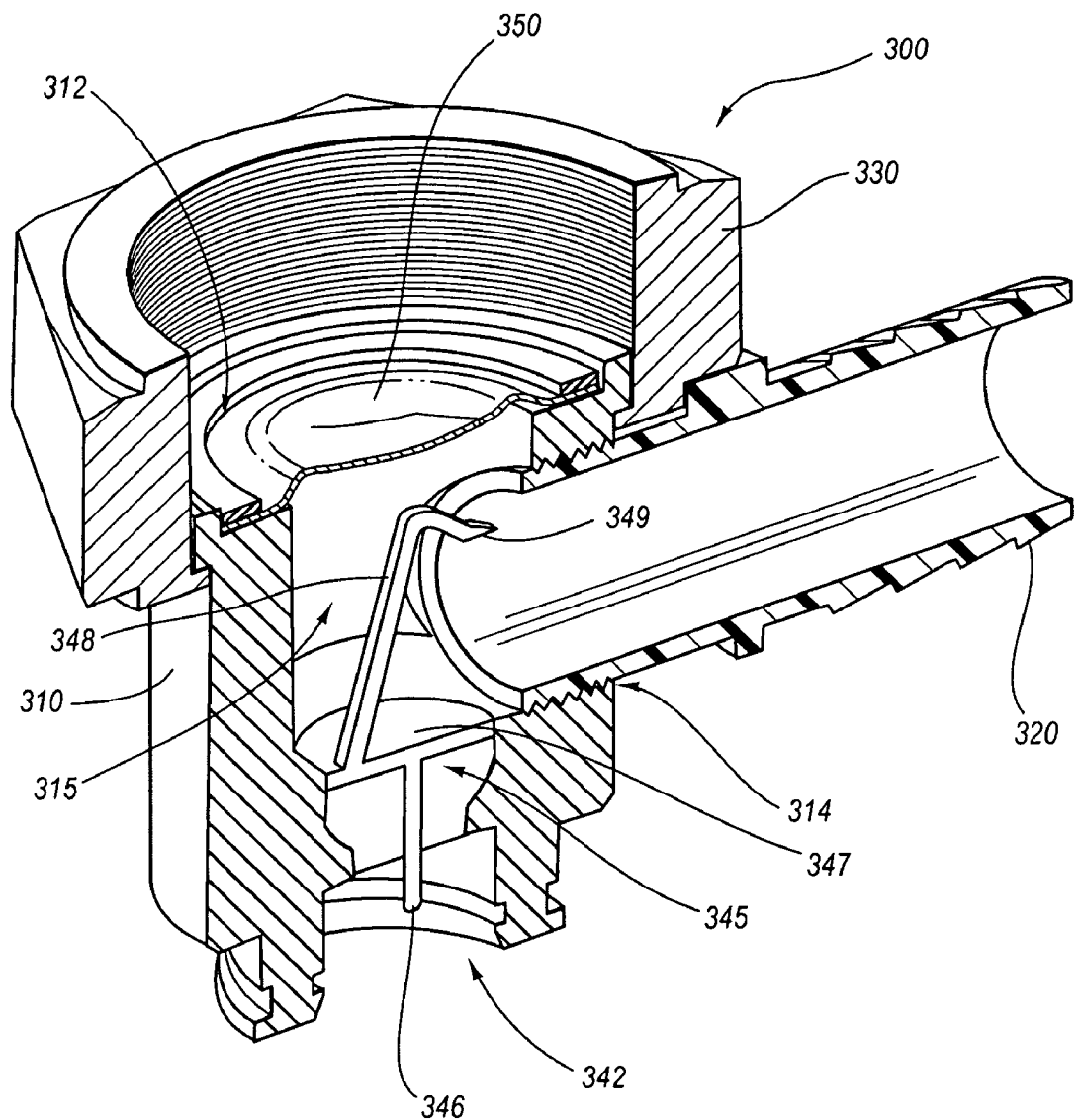
FIG. 5 is a cross-sectional view of still another embodiment of a relief valve.
Figure 6A:
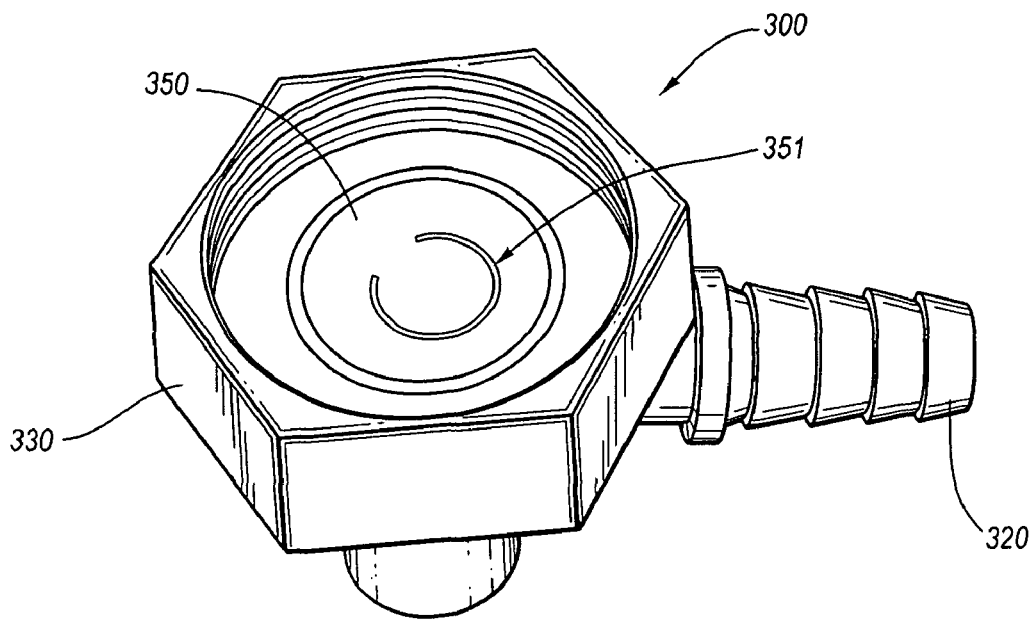
FIG. 6A is a perspective view of the relief valve embodiment of FIG. 5.
Figure 6B:
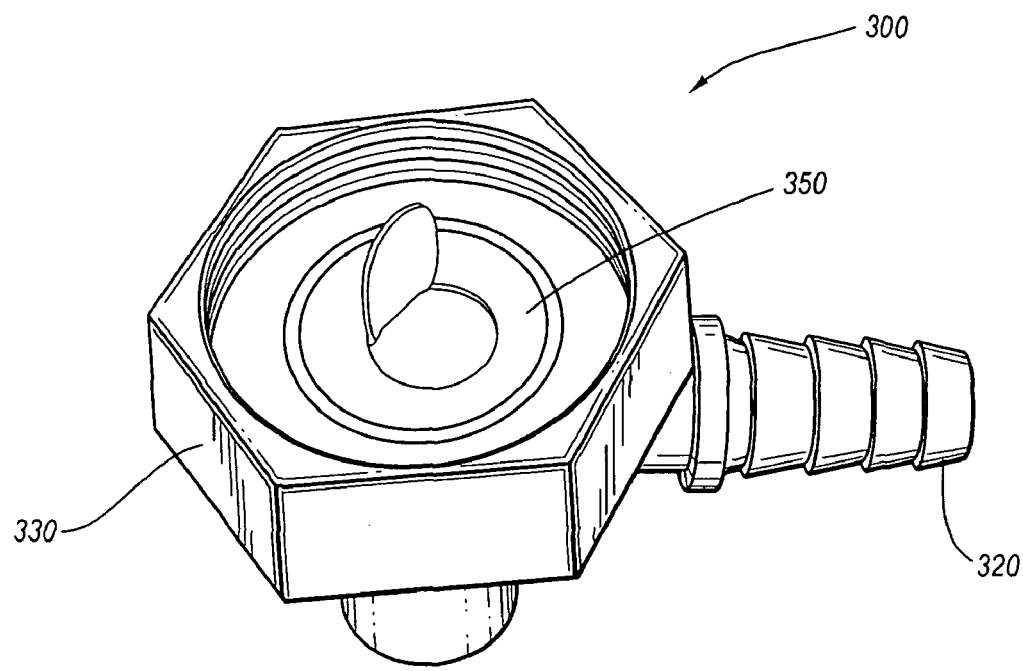
FIG. 6B is a perspective view like that of FIG. 6A with the puncture disc open.

Yet another embodiment of the invention is shown in FIG. 5 and FIGS. 6A-6B. In this embodiment, relief valve 300 includes housing 310 having a cavity 315 defined therein. Cavity 315 is in fluid communication with two openings, first opening 312 and second opening 314, in housing 310. First opening 312 may be threaded to allow for connection with a connector piece 330. Connector piece 330, in this embodiment, comprises a nut. Crimp sleeve 230 and nut 330 are each examples of connecting means for facilitating a sealing connection with a fluid distribution line.

Nut 330 may optionally be threaded at both ends in order to allow for connection with a fluid distribution line and connection with the body of the valve. Second opening 314 may also be threaded to allow for connection with vent nipple 320. Relief valve 300 also includes an active material initiator 345 and a port 342 adapted to receive an electrical activator (not shown). Active material initiator 345 is again positioned and aligned such that, upon deployment of the active material initiator 345, it will rupture the rupture disc 350 and thereby allow for fluid communication through the first opening 312.

Active material initiator 345 may comprise one or more electrical connectors 346, a base portion 347, a body portion 348, and an end portion 349. All or a portion of active material initiator 345 may comprise an active material, such as a shape memory alloy (SMA). Electrical connector 346 is configured to receive and be in electric communication with an electrical activator. Base portion 347 may be configured to comprise a liquid-tight seal with valve body 310 as well as allow electric communication from electrical connector 346 to body portion 348. Body portion 348 may be coupled to base portion 347 at one end and have an end portion 349 at another end. Body portion 348 may comprise an active material, such as an SMA. Also, as in the depicted embodiment, the body portion may feature a bent portion. End portion 349 may comprise a contiguous extension of body portion 348, or may comprise a separate plastic or metal piece that is coupled to the body portion. End portion 349 may comprise a point or spike and is configured to rupture burst disc 350 upon actuation of relief valve 300.

FIG. 6A shows relief valve 300 prior to deployment with rupture disc 350 intact and FIG. 6B shows the same embodiment following deployment. As shown in FIG. 6A, rupture disc 350 may optionally be scored, such as is represented by score line 351, to further facilitate rupturing the rupture disc upon deployment of the initiator. Score line 351 is shaped in the form of a circle but does not extend all the way around the perimeter of the defined circle. Such a configuration may be used to allow a flap to be formed in the rupture disc following deployment of the initiator. The flap would remain attached at the unscored portion of the rupture disc. Of course, in embodiments including a scored portion, the scored portion need not be circular in shape. In addition, whatever shape is used, it is not necessary that the score extend all the way around the perimeter of the shape. However, if the score line does fully extend around a perimeter, it is likely that a piece of the rupture disc will be left in the valve following deployment and potentially disrupt or be carried away by the flow of fluid in the fluid system.

Figure 7:
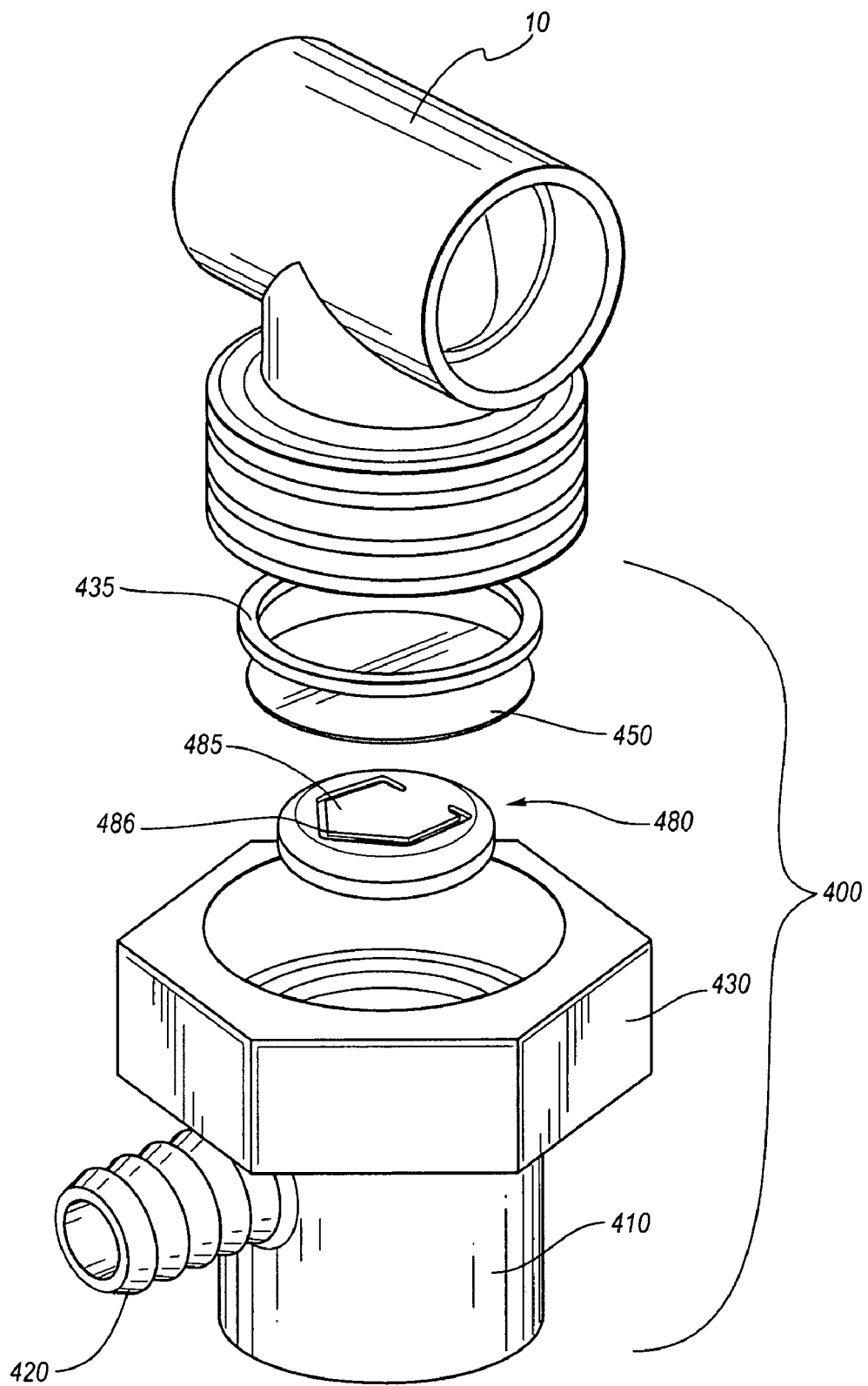
FIG. 7 is an exploded view of yet another embodiment of a relief valve including a cutter piece.
Figure 8:
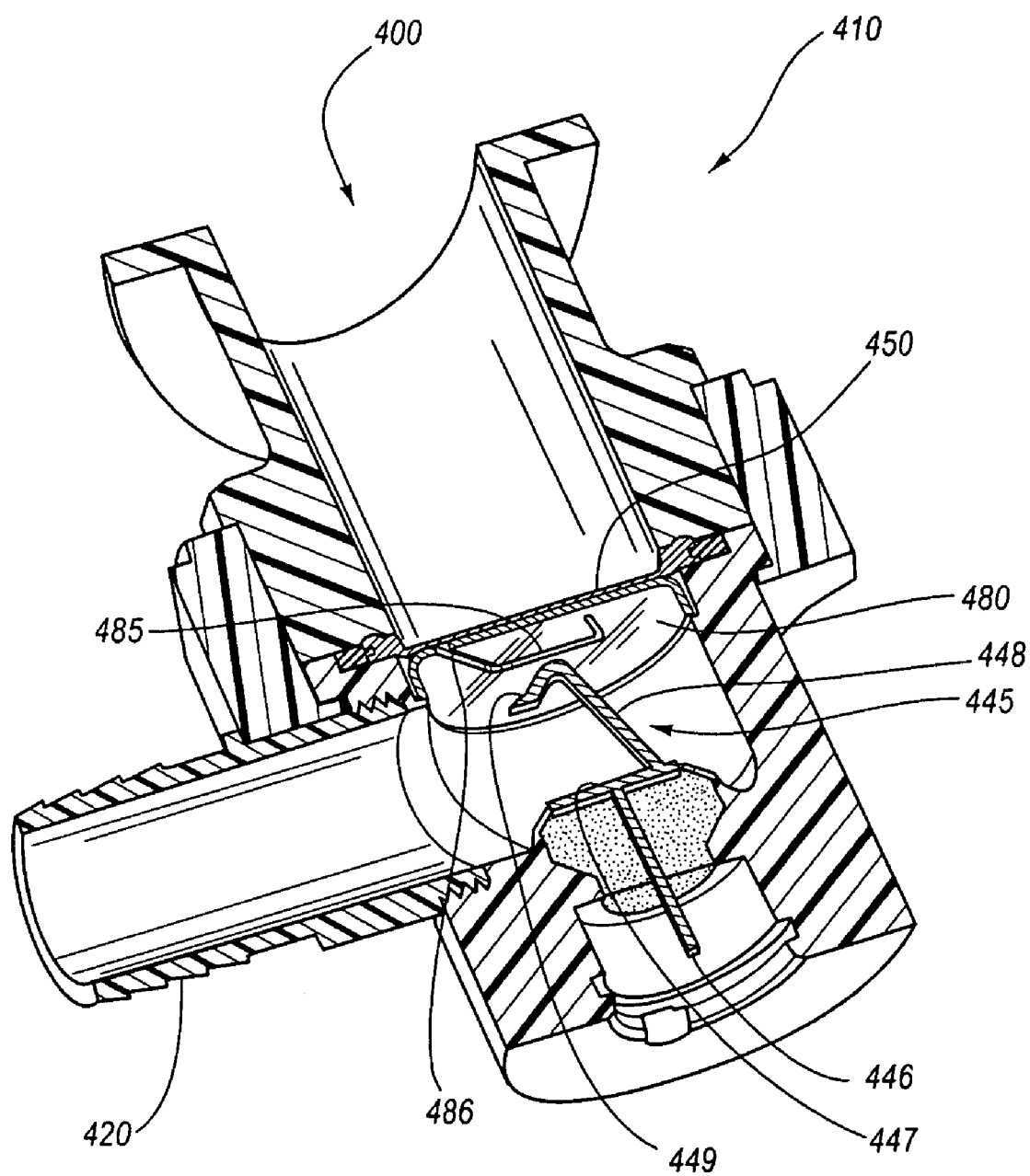
FIG. 8 is a cross-sectional view of the relief valve embodiment of FIG. 7.

FIGS. 7-8 depict yet another embodiment of the invention. Relief valve 400 in these figures includes body 410, hose nipple 420, connector piece 430, sealing washer 435, and rupture disc 450. Connector piece 430, in this embodiment, comprises a nut. However, it should be understood that the connector piece may comprise any other structure capable of facilitating a sealing connection of the valve to a fluid distribution line, including a crimp sleeve, bayonet lock, another type of clamp, or any other suitable structure.

Active material initiator 445 may comprise one or more electrical connectors 446, a base portion 447, a body portion 448, and an end portion 449. All or a portion of active material initiator 445 may comprise an active material, such as a shape memory alloy (SMA). Electrical connector 446 is configured to receive and be in electric communication with an electrical activator. Base portion 447 may be configured to comprise a liquid-tight seal with valve body 410 as well as allow electric communication from electrical connector 446 to body portion 448. Body portion 448 may be coupled to base portion 447 at one end and have an end portion 449 at another end. Body portion 448 may comprise an active material, such as an SMA, and in the depicted embodiment comprises a bent portion. End portion 449 may comprise a contiguous extension of body portion 448, or may comprise a separate plastic or metal piece that is coupled to the body portion.

The embodiment of FIGS. 7-8 also includes a cutter piece 480. Cutter piece 480 may be positioned between initiator 445 and rupture disc 450. Cutter piece 480 facilitates puncturing of the rupture disc 450. In the depicted embodiments of the invention including a cutter piece, the cutter piece 480 is configured to puncture the rupture disc 450 upon deployment of the active material initiator 445. Cutter piece is an example of cutting means for puncturing the valve means and thereby establishing fluid communication through the first opening.

The embodiment of cutter piece 480 shown in the accompanying figures includes a cutting member 485. Cutting member 485 is pivotably connected with cutter piece 480. If initiator 445 is positioned adjacent to cutter piece 480, this allows end portion 449 of initiator 445 to contact and force cutting member 485 to pivot about its axis on cutter piece 480 upon deployment of the initiator 445. Once cutting member 485 is forced to pivot away from cutter piece 480, it will make contact with the rupture disc 450 and will puncture the rupture disc and thereby allow for fluid communication there through. In alternative embodiments, the body portion or end portion of the initiator may be attached or coupled to the cutting member.

As can best be seen in FIG. 8, cutting member 485 has a pointed tip 486. Pointed tip 486 further assists in puncturing rupture disc 450 by providing a small cross-sectional area with which to cause the initial puncture in the disc. In addition to, or instead of, including a pointed tip, embodiments of cutting members may include a raised and/or sharpened edge to further facilitate puncturing the rupture disc.

Figure 9:
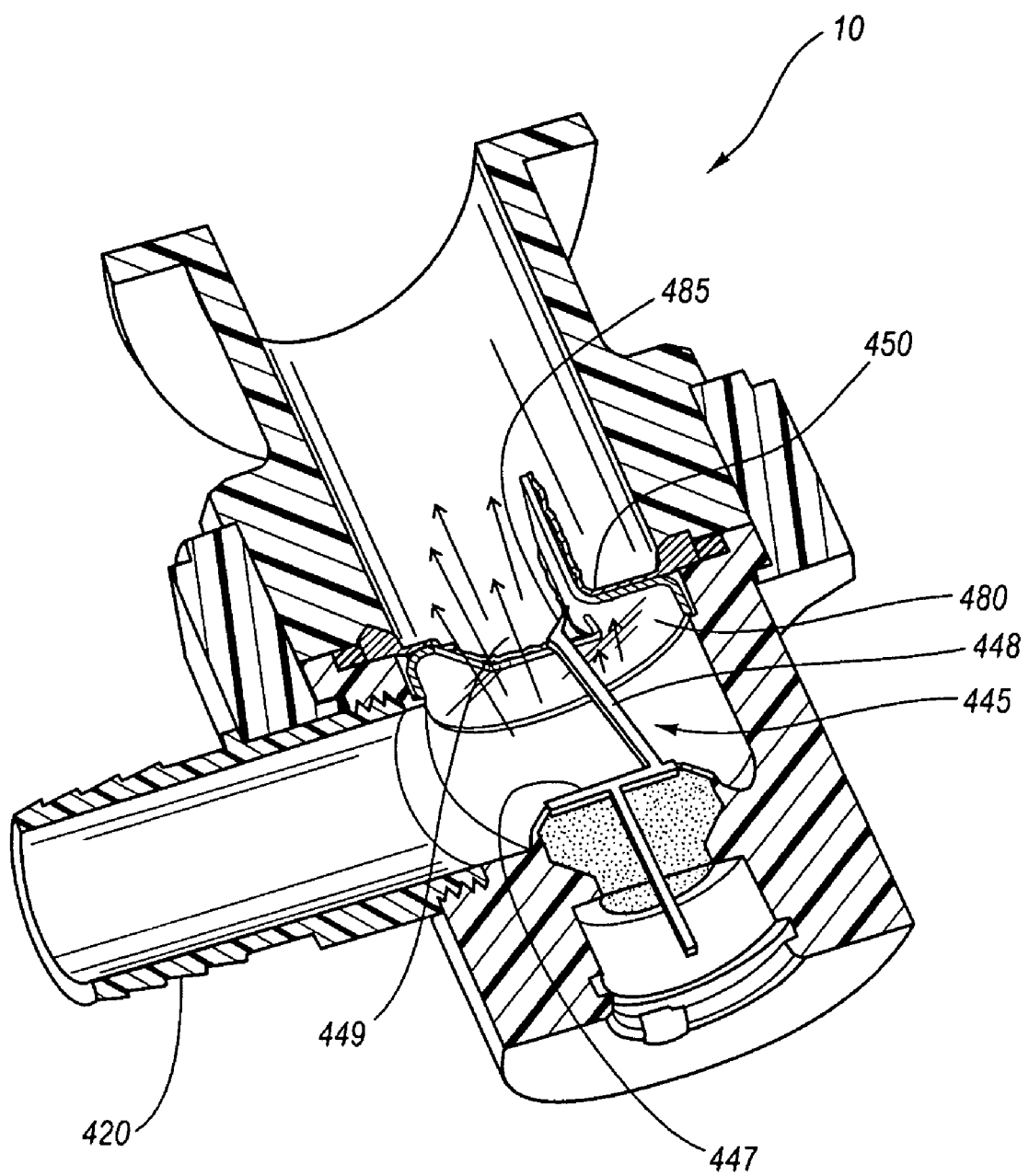
FIG. 9 is a cross-sectional view of the relief valve embodiment of FIG. 8 with a deployed cutting member.

FIG. 9 depicts cutter piece 480 with its cutting member 485 in its pivoted position away from cutter piece 480 as it would appear following deployment. As seen in FIG. 9, rupture disc 450 has been punctured by cutting member 485, creating an opening to allow for fluid communication between cavity 415 and the opening leading to tee fitting 10.

Figure 10:
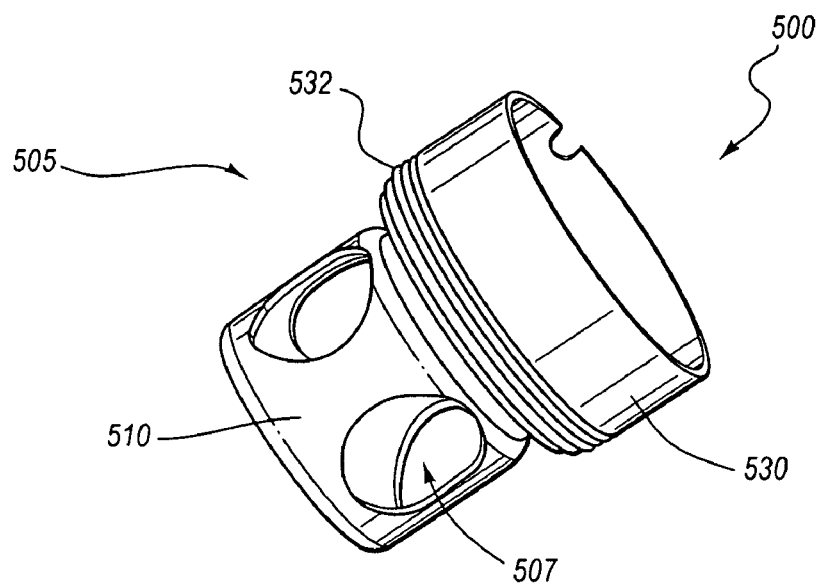
FIG. 10 is a perspective view of a support structure and crimp sleeve.
Figure 11:
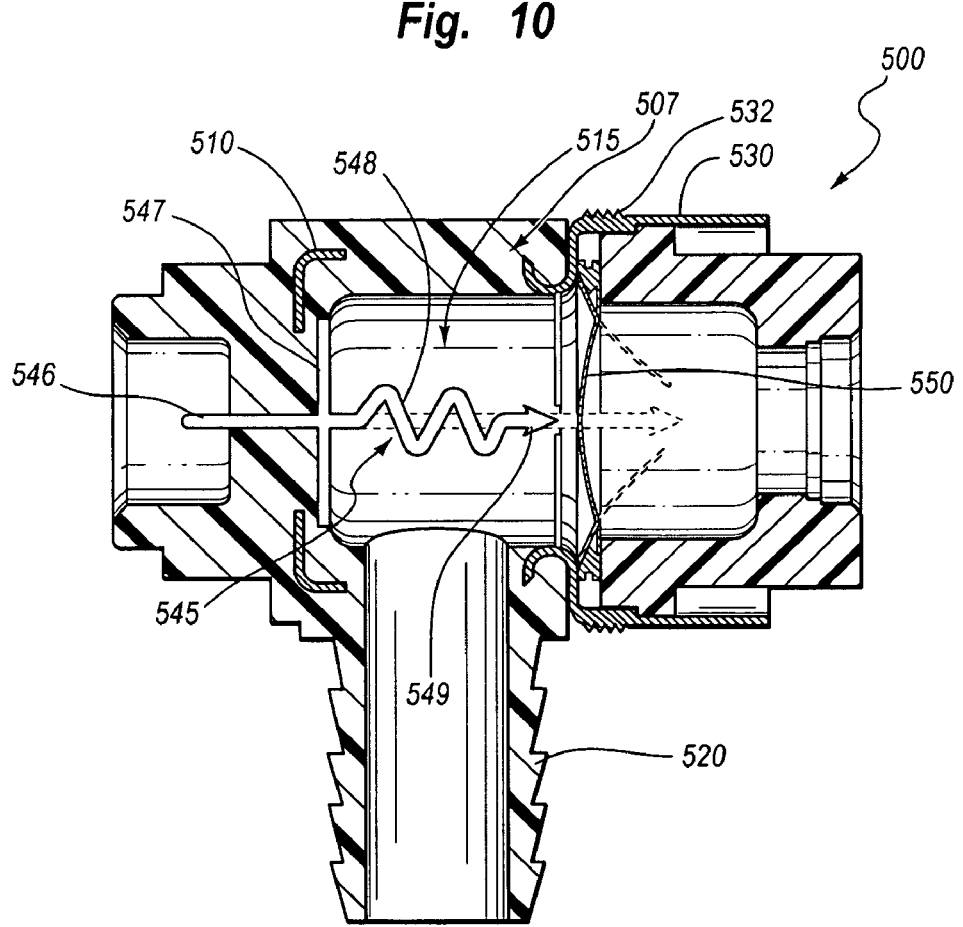
FIG. 11 is a cross-sectional view of a relief valve embodiment incorporating the support structure and crimp sleeve of FIG. 10.

In order to increase the strength of the device and allow it to withstand greater deployment forces, a support structure may be included with some embodiments of the invention. Such a support structure may optionally be formed with a crimp sleeve. For example, support structure 505 in FIG. 10 includes body portion 510 integrally formed with crimp sleeve portion 530. Support structure 505 may be coupled to valve 500 via threads 532. Support structure 505 surrounds and supports the initiator chamber 515, as shown in FIG. 11. Support structure 505 also includes apertures 507 formed in a sidewall of the structure. One aperture 507 facilitates fluid communication from chamber 515 through hose nipple 520. Additional apertures 507 allow plastic to bond around support structure 505. Of course, just a single aperture, at which hose nipple 520 is attached, may be used in alternative embodiments.

Active material initiator 545 may comprise one or more electrical connectors 546, a base portion 547, a body portion 548, and an end portion 549. All or a portion of active material initiator 545 may comprise an active material, such as a shape memory alloy (SMA). Electrical connector 546 is configured to receive and be in electric communication with an electrical activator. Base portion 547 may be configured to comprise a liquid-tight seal with valve body 510 as well as allow electric communication from electrical connector 546 to body portion 548. Body portion 548 may be coupled to base portion 547 at one end and have an end portion 549 at another end. Body portion 548 may comprise a coil of an SMA, wherein upon receiving an activation signal, the body portion adopts a more extended configuration such that end portion 549 ruptures burst disc 550. End portion 549 may comprise a contiguous extension of body portion 548, or may comprise a separate plastic or metal piece that is coupled to the body portion. Further, end portion 549 may comprise a point or spike.

Suitable shape memory alloys can exhibit a one-way shape memory effect, an intrinsic two-way effect (wherein a first and a second shape may be attained by the alloy without applying an additional force to the alloy), or an extrinsic two-way shape memory effect (wherein transition of the alloy between possible shapes may be at least partially obtained by the application of an outside force) depending on the alloy composition and processing history. The two phases that occur in shape memory alloys are often referred to as martensite and austenite phases. The martensite phase is a relatively soft and easily deformable phase of the shape memory alloys, which generally exists at lower temperatures. The austenite phase, the stronger phase of shape memory alloys, occurs at higher temperatures. Shape memory materials formed from shape memory alloy compositions that exhibit one-way shape memory effects do not automatically reform, and depending on the shape memory material design, will likely require an external mechanical force to reform the shape orientation that was previously exhibited. Shape memory materials that exhibit an intrinsic shape memory effect are fabricated from a shape memory alloy composition that will automatically reform themselves.

The temperature at which the shape memory alloy remembers its high temperature form when heated can be adjusted by slight changes in the composition of the alloy and through heat treatment. In nickel-titanium shape memory alloys, for example, it can be changed from above about 100° C. to below about −100° C. The shape recovery process occurs over a range of just a few degrees and the start or finish of the transformation can be controlled to within a degree or two depending on the desired application and alloy composition.

The mechanical properties of the shape memory alloy vary greatly over the temperature range spanning their transformation, typically providing the shape memory material with shape memory effects as well as high damping capacity. The inherent high damping capacity of the shape memory alloys can be used to further increase the energy absorbing properties.

Suitable shape memory alloy materials include without limitation nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-platinum based alloys, iron-palladium based alloys, and the like. The alloys can comprise two components (binary alloys), three components (ternary alloys), or any higher order so long as the alloy composition exhibits a shape memory effect, e.g., change in shape orientation, damping capacity, and the like. For example, a nickel-titanium based alloy is commercially available under the trademark NITINOL from Shape Memory Applications, Inc.

Other suitable active materials are shape memory polymers. Similar to the behavior of a shape memory alloy, when the temperature is raised through its transition temperature, the shape memory polymer also undergoes a change in shape orientation. Dissimilar to SMAs, raising the temperature through the transition temperature causes a substantial drop in modulus. While SMAs are well suited as actuators, SMPs are better suited as "reverse" actuators. That is, by undergoing a large drop in modulus by heating the SMP past the transition temperature (Tg), release of stored energy blocked by the SMP in its low temperature high modulus form can occur. To set the permanent shape of the shape memory polymer, the polymer must be at about or above the transition temperature (Tg) or melting point of the hard segment of the polymer. "Segment" refers to a block or sequence of polymer forming part of the shape memory polymer. The shape memory polymers are shaped at the temperature with an applied force followed by cooling to set the permanent shape. The temperature necessary to set the permanent shape is typically between about 100° C. to about 300° C. Setting the temporary shape of the shape memory polymer requires the shape memory polymer material to be brought to a temperature at or above the Tg or transition temperature of the soft segment, but below the Tg or melting point of the hard segment. At the soft segment transition temperature (also termed "first transition temperature"), the temporary shape of the shape memory polymer is set followed by cooling of the shape memory polymer to lock in the temporary shape. The temporary shape is maintained as long as it remains below the soft segment transition temperature. The permanent shape is regained when the shape memory polymer fibers are once again brought to or above the transition temperature of the soft segment. Repeating the heating, shaping, and cooling steps can reset the temporary shape. The soft segment transition temperature can be chosen for a particular application by modifying the structure and composition of the polymer. Transition temperatures of the soft segment range from about −63° C. to above about 120° C.

Shape memory polymers may contain more than two transition temperatures. A shape memory polymer composition comprising a hard segment and two soft segments can have three transition temperatures: the highest transition temperature for the hard segment and a transition temperature for each soft segment.

Most shape memory polymers exhibit a "one-way" effect, wherein the shape memory polymer exhibits one permanent shape. Upon heating the shape memory polymer above the first transition temperature, the permanent shape is achieved and the shape will not revert back to the temporary shape without the use of outside forces. As an alternative, some shape memory polymer compositions can be prepared to exhibit a "two-way" effect. These systems consist of at least two polymer components. For example, one component could be a first cross-linked polymer while the other component is a different cross-linked polymer. The components are combined by layer techniques, or are interpenetrating networks, wherein two components are cross-linked but not to each other. By changing the temperature, the shape memory polymer changes its shape in the direction of the first permanent shape of the second permanent shape. Each of the permanent shapes belongs to one component of the shape memory polymer. The two permanent shapes are always in equilibrium between both shapes. The temperature dependence of the shape is caused by the fact that the mechanical properties of one component ("component A") are almost independent from the temperature in the temperature interval of interest. The mechanical properties of the other component ("component B") depend on the temperature. In one embodiment, component B becomes stronger at low temperatures compared to component A, while component A is stronger at high temperatures and determines the actual shape. A two-way memory device can be prepared by setting the permanent shape of component A ("first permanent shape"); deforming the device into the permanent shape of component B ("second permanent shape") and fixing the permanent shape of component B while applying a stress to the component.

Similar to the shape memory alloy materials, the shape memory polymers can be configured in many different forms and shapes. The temperature needed for permanent shape recovery can be set at any temperature between about −63° C. and about 120° C. or above. Engineering the composition and structure of the polymer itself can allow for the choice of a particular temperature for a desired application. For example, in one embodiment the low end for a temperature range for the temperature for shape recovery is greater than or equal to about −30° C., in another embodiment the temperature is greater than or equal to about 0° C., and in yet another embodiment the temperature is greater than or equal to about 50° C. Also, for example, the high end for a temperature range for the temperature for shape recovery is in one embodiment less than or equal to about 120° C., in another embodiment than or equal to about 90° C., and in yet another embodiment less than or equal to about 70° C. Of course, the temperature may be within a range between combinations of these low ends and high ends so for example, the temperature may range from greater than or equal to about to about 50° C. and less than or equal to about 120° C., 90° C. or 70° C.

Suitable shape memory polymers include thermoplastics, thermosets, interpenetrating networks, semi-interpenetrating networks, or mixed networks. The polymers can be a single polymer or a blend of polymers. The polymers can be linear or branched thermoplastic elastomers with side chains or dendritic structural elements. Suitable polymer components to form a shape memory polymer include, but are not limited to, polyphosphazenes, poly(vinyl alcohols), polyamides, polyester amides, poly(amino acid)s, polyanhydrides, polycarbonates, polyacrylates, polyalkylenes, polyacrylamides, polyalkylene glycols, polyalkylene oxides, polyalkylene terephthalates, polyortho esters, polyvinyl ethers, polyvinyl esters, polyvinyl halides, polyesters, polylactides, polyglycolides, polysiloxanes, polyurethanes, polyethers, polyether amides, polyether esters, and copolymers thereof. Examples of suitable polyacrylates include poly(methyl methacrylate), poly(ethyl methacrylate), ply(butyl methacrylate), poly(isobutyl methacrylate), poly(hexyl methacrylate), poly(isodecyl methacrylate), poly(lauryl methacrylate), poly(phenyl methacrylate), poly(methyl acrylate), poly(isopropyl acrylate), poly(isobutyl acrylate) and poly(octadecyl acrylate). Examples of other suitable polymers include polystyrene, polypropylene, polyvinyl phenol, polyvinylpyrrolidone, chlorinated polybutylene, poly(octadecyl vinyl ether) ethylene vinyl acetate, polyethylene, poly(ethylene oxide)-poly(ethylene terephthalate), polyethylene/nylon (graft copolymers, polycaprolactones-polyamide (block copolymer), poly(caprolactone) dimethacrylate-n-butyl acrylate, poly(norbornyl-polyhedral oligomeric silsequioxane), polyvinylchloride, urethane/butadiene copolymers, polyurethane block copolymers, styrene-butadiene-styrene block copolymers, and the like.

The shape memory polymer or the shape memory alloy, may be activated by any suitable means, such as means for subjecting the material to a, temperature change above, or below, a transition temperature. For example, for elevated temperatures, heat may be supplied using hot gas (e.g., air), steam, hot liquid, or electrical current. The activation means may, for example, be in the form of heat conduction from a heated element in contact with the shape memory material, heat convection from a heated conduit in proximity to the thermally active shape memory material, a hot air blower or jet, microwave interaction, resistive heating, and the like. In the case of a temperature drop, heat may be extracted by using cold gas, or evaporation of a refrigerant. The activation means may, for example, be in the form of a cool room or enclosure, a cooling probe having a cooled tip, a control signal to a thermoelectric unit, a cold air blower or jet, or means for introducing a refrigerant (such as liquid nitrogen) to at least the vicinity of the shape memory material.

Furthermore, any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified.

Without further elaboration, it is believed that one skilled in the art can use the preceding description to utilize the present disclosure to its fullest extent. The examples and embodiments disclosed herein are to be construed as merely illustrative and not a limitation to the scope of the present disclosure in any way. It will be apparent to those having skill in the art that changes may be made to the details of the above-described embodiments without departing from the underlying principles of the disclosure described herein. In other words, various modifications and improvements of the embodiments specifically disclosed in the description above are within the scope of the appended claims. Note that elements recited in means-plus-function format are intended to be construed in accordance with 35 U.S.C. §112 ¶6. The scope of the disclosure is therefore defined by the following claims.

The invention claimed is:

1. A relief valve comprising:
   a body, wherein the body defines a cavity, a first opening and a second opening, wherein the first opening and the second opening are in fluid communication with the cavity;
   an active material initiator integrally molded with the body, wherein the active material initiator at least partially comprises a shape memory alloy,
      wherein the active material initiator comprises at least one electrical connector, a base portion, a body portion, and an end portion,
      wherein the base portion allows electric communication with the body portion from the electrical connector, and
      wherein the body portion is between the base portion and the end portion; and,
   a rupture disc disposed within and obstructing the first opening, wherein the rupture disc is positioned and aligned with the active material initiator such that, upon deployment of the active material initiator, the active material initiator ruptures the rupture disc and thereby allows for fluid communication through the first opening.

2. The relief valve of claim 1, wherein the relief valve is in pressurized connection with a refrigerant system.

3. The relief valve of claim 1, wherein the body portion has a bent portion that comprises a shape memory alloy.

4. The relief valve of claim 3, wherein upon receiving a deployment signal, the shape memory alloy bent portion changes its configuration such that the end portion of the body portion contacts and ruptures the rupture disc.

5. A relief valve in pressurized connection with a refrigerant system, comprising:
   a body, wherein the body defines a cavity, a first opening and a second opening, wherein the first opening and the second opening are in fluid communication with the cavity;
   an active material initiator integrally molded with the body, wherein the active material initiator at least partially comprises a shape memory alloy,
      wherein the active material initiator comprises at least one electrical connector, a base portion, a body portion, and an end portion,
      wherein the base portion allows electric communication with the body portion from the electrical connector, and
      wherein the body portion is between the base portion and the end portion;
   a crimp sleeve connected to the body at the first opening;
   a hose nipple connected to the body at the second opening; and
   a rupture disc disposed within and obstructing the first opening, wherein the rupture disc is positioned and aligned with the active material initiator such that, upon deployment of the active material initiator, the active material initiator ruptures the rupture disc and thereby allows for fluid communication through the first opening.

6. The relief valve of claim 5, wherein the body portion has a bent portion that comprises a shape memory alloy.

7. The relief valve of claim 6, wherein upon receiving a deployment signal, the shape memory alloy bent portion changes its configuration such that the end portion of the body portion contacts and ruptures the burst disc.

8. The relief valve of claim 5, wherein the hose nipple is integrally molded with the body.

9. The relief valve of claim 5, wherein the crimp sleeve is integrally molded with the body.

10. The relief valve of claim 5, wherein the rupture disc is mounted within the crimp sleeve.

11. The relief valve of claim 10, wherein a sealing washer is positioned between the crimp sleeve and the rupture disc.

12. The relief valve of claim 5, further comprising a tee fitting connected to the body and in fluid communication with the cavity of the body at the first opening, wherein the tee fitting is connected to the body with the crimp sleeve, and wherein the tee fitting is designed to be integrated with an automotive refrigerant line.

13. The relief valve of claim 5, wherein the active material initiator is operably coupled with a cutter piece configured to puncture the rupture disc upon deployment of the active material initiator.

14. The relief valve of claim 5, wherein the first opening is oriented approximately perpendicular to the second opening.

15. The relief valve of claim 5, wherein the first opening is axially aligned with or approximately parallel to the second opening.

16. The relief valve of claim 5, further comprising an electrical activator connected to the electrical connector.

17. The relief valve of claim 5, wherein the body is formed from a plastic material.

18. The relief valve of claim 5, further comprising a support structure integrally molded with the body.

19. An automotive refrigeration system comprising:
a refrigerant line;
a relief valve connected with the refrigerant line, the relief valve comprising a body, wherein the body defines a cavity, a first opening and a second opening, wherein the first opening and the second opening are in fluid communication with the cavity;
an active material initiator integrally molded with the body;
wherein the active material initiator at least partially comprises a shape memory alloy,
wherein the active material initiator comprises at least one electrical connector, a base portion, a body portion, and an end portion,
wherein the base portion allows electric communication with the body portion from the electrical connector, and
wherein the body portion is between the base portion and the end portion;
a crimp sleeve connected to the body at the first opening; and
a rupture disc disposed within and obstructing the first opening, wherein the rupture disc is positioned and aligned with the active material initiator such that, upon deployment of the active material initiator, the active material initiator ruptures the rupture disc and thereby allows for fluid communication through the first opening.

20. The relief valve of claim 19, wherein the body portion has a bent portion that comprises a shape memory alloy.

21. The relief valve of claim 20, wherein upon receiving a deployment signal, the shape memory alloy bent portion changes its configuration such that the end portion contacts and ruptures the burst disc.

22. The automotive refrigeration system of claim 19, wherein the relief valve is connected with the refrigerant line via a tee fitting on the refrigerant line, wherein the tee fitting is in fluid communication with the cavity of the body at the first opening, and wherein the tee fitting is connected to the body with the crimp sleeve.

23. The automotive refrigeration system of claim 19, wherein the active material initiator is coupled with a cutter piece configured to puncture the rupture disc upon deployment of the active material initiator.

24. The automotive refrigeration system of claim 19, wherein the relief valve is connected with the refrigerant line via a tee fitting on the refrigerant line, wherein the tee fitting is in fluid communication with the cavity of the body at the first opening, and wherein the tee fitting is connected to the body with the crimp sleeve.

25. The automotive refrigeration system of claim 19, wherein the active material initiator is coupled with a cutter piece configured to puncture the rupture disc upon deployment of the active material initiator.

26. A relief valve comprising:
a body, wherein the body defines a cavity, a first opening and a second opening, wherein the first opening and the second opening are in fluid communication with the cavity;
an active material initiator integrally molded with the body,
wherein the active material initiator at least partially comprises a shape memory alloy,
wherein the active material initiator comprises a body portion and an end portion,
wherein the body portion of the active material initiator comprises a coil of shape memory alloy; and;
a rupture disc disposed within and obstructing the first opening, wherein the rupture disc is positioned and aligned with the active material initiator such that, upon receiving an activation signal, the coil adopts a less coiled configuration such that the end portion of the coil causes the rupture disc to rupture and thereby allows for fluid communication through the first opening.

27. The relief valve of claim 26, wherein the active material initiator further comprises at least one electrical connector body portion and a base portion, wherein the base portion allows electric communication with the body portion from the electrical connector, and wherein the body portion is between the base portion and the end portion.

28. The relief valve of claim 26, wherein the relief valve is in pressurized connection with a refrigerant system.

29. A relief valve in pressurized connection with a refrigerant system, comprising:
a body, wherein the body defines a cavity, a first opening and a second opening, wherein the first opening and the second opening are in fluid communication with the cavity;
an active material initiator integrally molded with the body,
wherein the active material initiator at least partially comprises a shape memory alloy,
wherein the active material initiator comprises a body portion and an end portion,
wherein the body portion of the active material initiator comprises a coil of shape memory alloy; and;
a crimp sleeve connected to the body at the first opening;
a hose nipple connected to the body at the second opening; and
a rupture disc disposed within and obstructing the first opening, wherein the rupture disc is positioned and aligned with the active material initiator such that, upon receiving an activation signal, the coil adopts a less coiled configuration such that the end portion of the coil causes the rupture disc to rupture and thereby allows for fluid communication through the first opening.

30. The relief valve of claim 29, wherein the active material initiator further comprises at least one electrical connector body portion and a base portion, wherein the base portion allows electric communication with the body portion from the electrical connector, and wherein the body portion is between the base portion and the end portion.

31. The relief valve of claim 30, further comprising an electrical activator connected to the electrical connector.

32. The relief valve of claim 29, wherein the hose nipple is integrally molded with the body.

33. The relief valve of claim 29, wherein the crimp sleeve is integrally molded with the body.

34. The relief valve of claim 29, wherein the rupture disc is mounted within the crimp sleeve.

35. The relief valve of claim 34, wherein a sealing washer is positioned between the crimp sleeve and the rupture disc.

36. The relief valve of claim 29, further comprising a tee fitting connected to the body and in fluid communication with the cavity of the body at the first opening, wherein the tee fitting is connected to the body with the crimp sleeve, and wherein the tee fitting is designed to be integrated with an automotive refrigerant line.

37. The relief valve of claim 29, wherein the active material initiator is operably coupled with a cutter piece configured to puncture the rupture disc upon deployment of the active material initiator.

38. The relief valve of claim 29, wherein the first opening is oriented approximately perpendicular to the second opening.

39. The relief valve of claim 29, wherein the first opening is axially aligned with or approximately parallel to the second opening.

40. The relief valve of claim 29, wherein the body is formed from a plastic material.

41. The relief valve of claim 29, further comprising a support structure integrally molded with the body.

42. An automotive refrigeration system comprising:
a refrigerant line;
a relief valve connected with the refrigerant line, the relief valve comprising a body, wherein the body defines a cavity, a first opening and a second opening, wherein the first opening and the second opening are in fluid communication with the cavity;
an active material initiator integrally molded with the body;
   wherein the active material initiator at least partially comprises a shape memory alloy,
   wherein the active material initiator comprises a body portion and an end portion,
   wherein the body portion of the active material initiator comprises a coil of shape memory alloy; and;
a crimp sleeve connected to the body at the first opening; and
a rupture disc disposed within and obstructing the first opening, wherein the rupture disc is positioned and aligned with the active material initiator such that, upon receiving an activation signal, the coil adopts a less coiled configuration such that the end portion of the coil causes the rupture disc to rupture and thereby allows for fluid communication through the first opening.

43. The automotive refrigeration system of claim 42, wherein the active material initiator further comprises at least one electrical connector body portion and a base portion, wherein the base portion allows electric communication with the body portion from the electrical connector, and wherein the body portion is between the base portion and the end portion.

44. The automotive refrigeration system of claim 42, wherein the relief valve is in pressurized connection with a refrigerant system.

* * * * *